(12) United States Patent
Liu et al.

(10) Patent No.: US 6,608,403 B2
(45) Date of Patent: *Aug. 19, 2003

(54) POWER SUPPLY SYSTEM WITH AC REDUNDANT POWER SOURCES AND DC REDUNDANT POWER SUPPLIES

(75) Inventors: Chu-Kuang Liu, Pingjen (TW); Ching-Hsiang Chan, Taipei (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/957,271

(22) Filed: Sep. 20, 2001

(65) Prior Publication Data

US 2002/0145339 A1 Oct. 10, 2002

(30) Foreign Application Priority Data

Apr. 6, 2001 (TW) .......................................... 90108362 A

(51) Int. Cl.[7] .................................................. H02J 1/00

(52) U.S. Cl. ........................................... 307/77; 307/43

(58) Field of Search .............................. 307/64, 66, 77, 307/18.43; 363/65, 67, 69, 70

(56) References Cited

U.S. PATENT DOCUMENTS

| | | | | | |
|---|---|---|---|---|---|
| 3,946,375 A | * | 3/1976 | Bishop et al. | ................. | 363/41 |
| 5,319,536 A | * | 6/1994 | Malik | ............................ | 307/82 |
| 5,834,925 A | * | 11/1998 | Chesavage | ..................... | 307/58 |
| 5,886,889 A | * | 3/1999 | Escallier | ...................... | 318/107 |
| 5,917,253 A | * | 6/1999 | Rusnack | ....................... | 307/29 |
| 5,939,802 A | * | 8/1999 | Hornbeck | ..................... | 307/64 |

* cited by examiner

Primary Examiner—Brian Sircus
Assistant Examiner—Sharon A. Polk
(74) Attorney, Agent, or Firm—Alston & Bird LLP

(57) ABSTRACT

A power supply system with AC redundant power sources and DC redundant power supplies includes a plurality of AC power sources, each of the AC power sources is directly coupled in series with a corresponding one of the DC power supplies which are connected in parallel for outputting a voltage, for providing an input voltage to operate the corresponding one of the DC power supplies, and a control module coupled between the AC power sources and the DC power supply which is not directly coupled in series with a corresponding one of AC power sources for creating a conductive path to transfer the input voltage from one of the AC power sources to the DC power supply which is not directly coupled in series with a corresponding one of AC power sources when the other AC power source are abnormally interrupted in supplying an input voltage to operate the DC power supplies.

8 Claims, 2 Drawing Sheets

POWER SUPPLY SYSTEM WITH AC REDUNDANT POWER SOURCES AND DC REDUNDANT POWER SUPPLIES

FIELD OF THE INVENTION

The present invention relates to a power supply system, and more particularly, to a power supply system having AC redundant power sources with DC redundant power supplies.

DESCRIPTION OF THE RELATED ART

The contemporary power supply system with DC (direct current) redundant power supplies is depicted in FIG. 1. The power supply system with DC redundant power supplies includes a single AC (alternating current) power source 11 provided to supply AC electric power to operate a plurality of DC power supplies 12, 13, and 14 which are connected in parallel for outputting combined DC electric power. The configuration of the contemporary power supply system with DC redundant power supplies is advantageous over the situation that if one of the DC power supplies which is designated to supply DC electric power in normal operation is failed, the other DC power supplies can supply DC electric power without interruption.

Notwithstanding the advantages of the contemporary power supply system, assuming that the single AC power source 11 is abnormally interrupted in supplying AC electric power to operate the DC power supplies 12, 13, and 14, the operation of the whole power supply system will halt and the power supply system will come into power outage. As a rule, an ideal power supply system must includes not only the functionality of providing auxiliary DC power supplies, but also includes the functionality of providing auxiliary AC power sources to supply AC electric power to operate the DC power supplies in case the main AC power source in operation is abnormally interrupted.

The applicant therefore tried to contrive a power supply system having AC redundant power sources with DC redundant power supplies, to ensure that in case the main AC power source is interrupted in supplying AC electric power to operate the DC power supplies, the other AC power source can act as a redundant AC power source to supply auxiliary AC electric power to operate DC power supplies without interruption.

SUMMARY OF THE INVENTION

It is, therefore, an object of the present invention to provide a power supply system having DC redundant power supplies that can sustain supplying DC electric power in event that one of the DC power supplies is failed in supplying DC electric power.

It is still an object of the present invention to provide a power supply system having AC redundant power sources and DC redundant power supplies, to assure that the DC power supplies can sustain supplying DC electric power even if the main AC power source in operation is interrupted.

According to a preferred embodiment of the present invention, the power supply system is arranged to include three DC power supplies which are connected in parallel for outputting a combined DC power output, two AC power sources, each of the AC power sources is directly coupled in series with a corresponding one of DC power supplies to provide an input voltage to operate the corresponding one of the DC power supplies, and a control module coupled between the AC power sources and the DC power supply which is not directly coupled in series with a corresponding one of the AC power sources for creating a conductive path to transfer the input voltage from one of the AC power sources to the DC power supply which is not directly coupled in series with a corresponding one of AC power sources when the other AC power source is abnormally interrupted in supplying an input voltage to operate the DC power supplies.

The control module may comprises a first relay circuit coupled in series with one of the AC power sources for receiving an input voltage from the AC power source and transmitting the input voltage, a second relay circuit coupled in series with one of the AC power sources for receiving an input voltage from the AC power source and transmitting the input voltage, and a third relay circuit which is coupled with the first relay circuit and the second relay circuit and the DC power supply which is not directly coupled in series with one of the AC power sources for alternatively creating a conductive path in response to a control signal to provide either the input voltage being transmitted from the first relay circuit or the input voltage being transmitted from the second relay circuit to the DC power supply coupled therewith.

Both of the above-described first relay circuit and the second relay circuit are implemented by a one-to-one relay element, and the third relay circuit is implemented by a two-to-one relay element. The control module for creating a conductive path for transmitting the input voltage from one of the AC power sources to the DC power supply which is not directly coupled in series with the AC power sources further includes a microprocessor which persistently detects the input voltages from each of the AC power sources and generates a control signal to drive the third relay circuit to create a conductive path to transfer an input voltage from one of the AC power sources to the DC power supply which is coupled with the third relay circuit when the other AC power source is interrupted in supplying an input voltage to operate the DC power supplies, and generate a control signal to restore the conductive path between the interrupted AC power source and the corresponding power supply when the interrupted AC power source becomes normal.

Broadly speaking, the number of the DC power supplies of the power supply system in accordance with the present invention can be indicated in terms of 2N+1, wherein N is a positive integer number, and the number of the third relay circuits should be identical to the number of the DC power supplies each of which is coupled with a corresponding third relay circuit.

Now the foregoing and other features and advantages of the present invention will be more clearly understood through the following descriptions with reference to the accompanying drawings, wherein:

DETAILED DESCRIPTION OF THE PREFERRED EMBODIMENT

Figure 1:
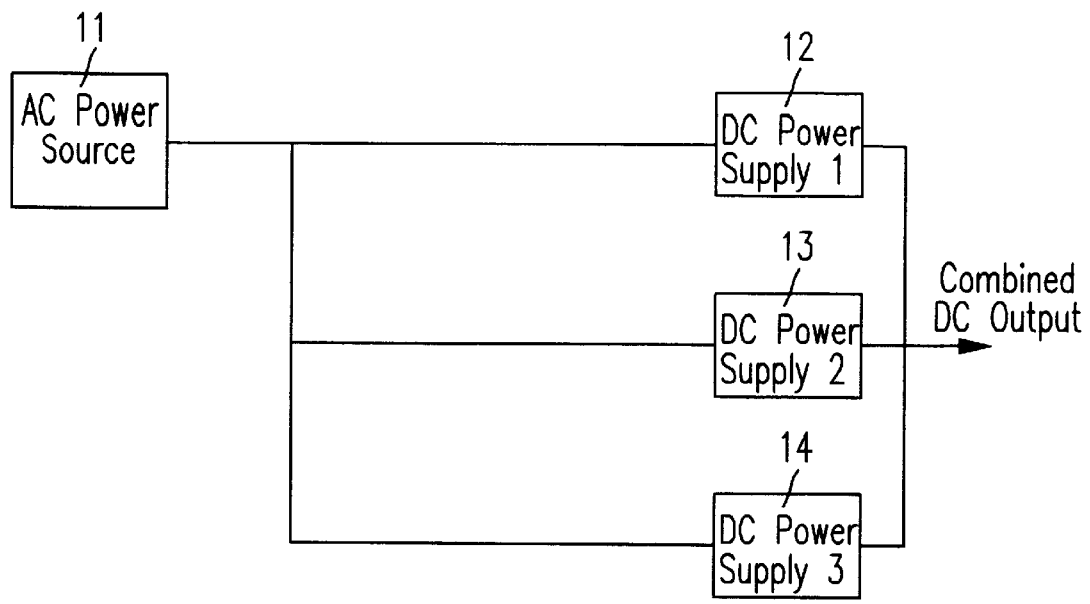
FIG. 1 schematically depicts a circuit block diagram of prior art power supply system with redundant DC power supplies.
Figure 2:
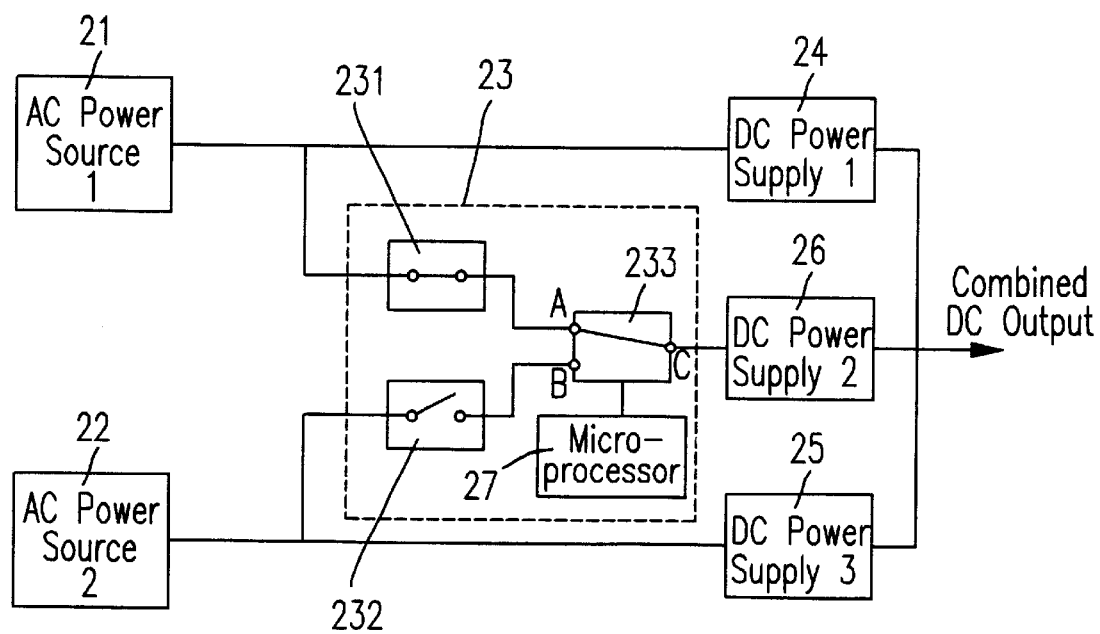
FIG. 2 is a plane view showing the power supply system with AC redundant power sources and DC redundant power supplies in normal operation according to an exemplary embodiment of the present invention.

An exemplary embodiment of the present invention will be illustrated by the following description and the drawings referred hereinafter. Referring to FIG. 2, the power supply system of the present invention comprehends two AC power sources 21 and 22 respectively directly coupled in series with a first DC power supply 24 and a third DC power supply 25 to provide AC electric power to respectively operate the first DC power supply 24 and the third DC power supply 25. A control module 23, which is made up of a first relay circuit 231, a second relay circuit 232, and a third relay circuit 233, is coupled between the AC power sources 21, 22 and a second DC power supply 26. The AC power sources 21 and 22 are also coupled in series with the first relay circuit 231 and the second relay circuit 232 of the control module 23, respectively. Both of the first relay circuit 231 and the second relay circuit 232 are coupled with the second DC power supply 26 through the third relay circuit 233. As depicted in FIG. 2, both of the first relay circuit 231 and the second relay circuit 232 are embodied in a one-to-one relay element, and the third relay circuit 233 is embodied in a two-to-one relay element. The DC power supplies 24, 25, 26 are connected in parallel to provide a combined DC electric power output to power a common load (which is not shown in the drawings). In event that an abnormality is occurred to one of the DC power supply such that it can not supply DC electric power to power the load, the other DC power supplies act as auxiliary power supplies to supply DC electric power to the load.

The control module 23 is configured to create a conductive path to transfer the input voltage provided by either the AC power source 21 or by the AC power source 22 to operate the second DC power supply 26 which is not directly coupled in series with the AC power sources 21 and 22. The first relay circuit 231 can be driven by the first AC power source 21 or first DC power supply 24, and the second relay circuit 232 also can be driven by the second AC power source 22 or the third DC power supply 25. The one-to-one relay element of the first relay circuit 231 is driven by either the input voltage from the first AC power source 21 or the trigger voltage of the first DC power supply 24 in such a way that if the voltage applied to the first relay circuit 231 is sufficient to turn on the relay element of the first relay circuit 231, the input voltage from the AC power source 21 can be transferred to the two-to-one relay element of the third relay circuit 233. In an analogous manner, the one-to-one relay element of the second relay circuit 232 is driven by either the input voltage of the first power source 21 or the trigger voltage of the third DC power supply 25 in such a way that if the voltage applied to the second relay circuit 232 is sufficient to turn on the relay element of the second relay circuit 232, the input voltage from the AC power source 22 can be transferred to the two-to-one relay element of the third relay circuit 233. With regard to the operation of the third relay circuit 233, it is controlled by the microprocessor 27. The operation of the third relay circuit 233 will be described in detail in the following.

Referring again to FIG. 2, in normal operation, the AC power source 21 is set to operate the DC power supplies 24 and 26, and the AC power source 22 is set to operate the DC power supply 25. As indicated in FIG. 2, the first DC power supply 24 receives the input voltage from the first AC power source 21 and outputs a voltage, and the first relay circuit 231 will be driven to turn on, whereby transfers the input voltage from the first AC power source 21 to the two-to-one relay element of the third relay circuit 233 which will be switched to turn on at position A. The microprocessor 27 is used to keep on monitoring the input voltages from each of the AC power sources 21 and 22, and generates a control signal to drive the third relay circuit 233 to be switched on position A when the zero-detecting point of the input voltage from the first AC power source 21 is detected. Then the third relay circuit 233 will receive the input voltage from the first AC power source 21 through the first relay circuit 231, and the input voltage from the first AC power source 21 will be transferred to the second DC power supply 26. A conductive path is then created between the AC power source 21 and the second DC power supply 26 by means of the switch operation of the first relay circuit 231 and the third relay circuit 233, regardless of the state of the second relay circuit 232. The output voltage of the whole power supply system is determined by the parallel connection of the three parallel DC power supplies 24, 25, and 26.

Figure 3:
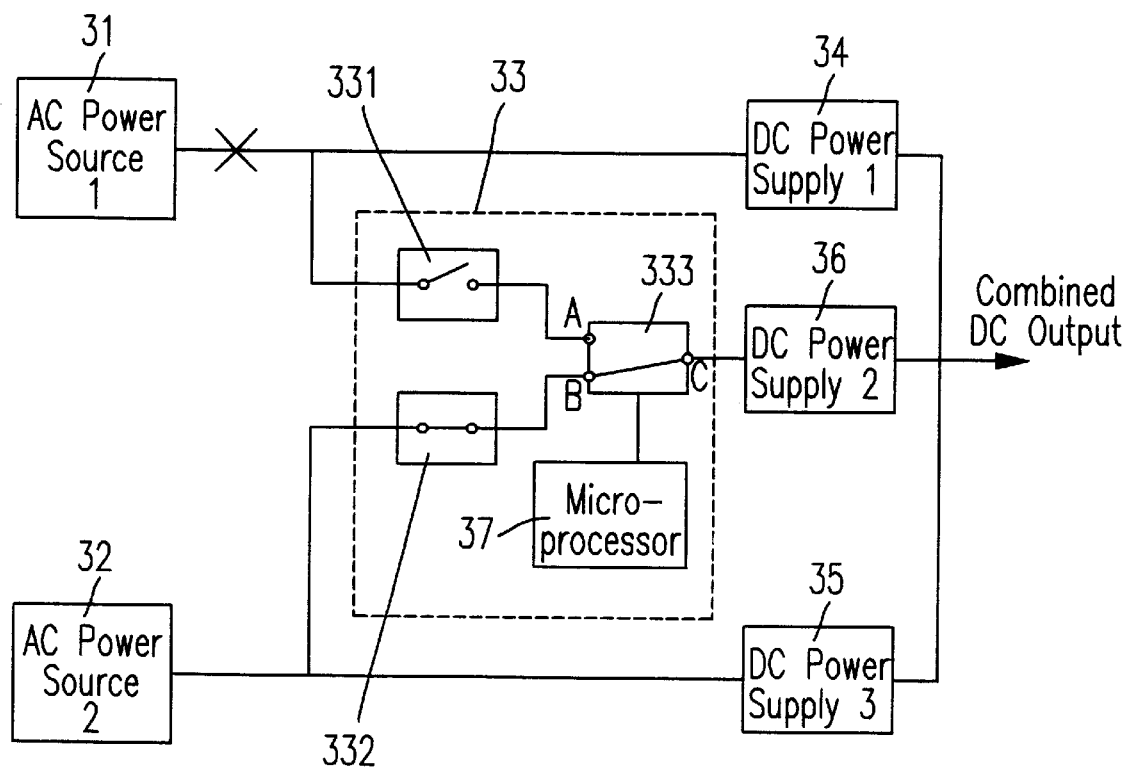
FIG. 3 illustrates the block diagram of the power supply system with AC redundant power sources and DC redundant power supplies according to an exemplary embodiment of the present invention, in which the AC power source in operation is interrupted.

As shown in FIG. 3, when the first AC power source 31 is interrupted to supply AC electric power to operate the first DC power supply 34, the first DC power supply 34 will not receive the input voltage from the AC power source 31. The first relay circuit 331 will automatically turn off and cut off the conductive path between the first AC powers source 31 and the second DC power supply 36. At that instant, the second relay circuit 32 which is driven by either the second AC power source 32 or the third DC power supply 35 will turn on. In the mean time, the microprocessor 37 generates a control signal to drive the third relay circuit 333 to be switched to turn on at position B when the zero-crossing point of the input voltage from the second input voltage source 32 is detected. Thereby the second AC power source 32 acts as an AC redundant power source, and an alternative conductive path is created to transfer the input voltage from the second AC power source 32 to the second DC power supply 36 through the switch operation of the second relay circuit 332 and the third relay circuit 333. Moreover, the interrupted AC power source 31 is still monitored by the microprocessor 37 such that when the interrupted AC power source 31 becomes normal, the microprocessor 37 can generate a control signal to restore the conductive path between the first AC powers source 31 and the DC power supplies 34 and 36. By controlling these relay circuits to change their state at the instant that the AC power source in operation is interrupted in supplying input voltage to operate the DC power supplies, an conductive path is created such that the AC power source acting as the redundant power source can supply its input voltage to operate the DC power supply which is not directly coupled with the AC power sources through the conductive path.

As mentioned above, the state of the third relay circuit 333 is switched in accordance with the zero-crossing point of the two input voltages from the AC power sources, in order that the sudden inrush current can be reduced and the spark come about during the switch operation can be avoided. Moreover, in order to precisely control the AC redundant power source to supply AC electric power instantaneously upon the time the AC power source in operation is interrupted, the microprocessor 37 is required to be incorporated into the control module 33 to monitor the input voltage of each of the AC power sources 31 and 32 and to detect that the zero-crossing point of the input voltages from the AC power source 31 and 32, thereby generating a control signal to drive the third relay circuit 333 to switch the turn-on position for creating a conductive path between the AC redundant power source and the DC power supply which is not directly coupled in series with the AC power sources 31 and 32. In addition, the AC power sources of the power supply system can be either a domestic power source or an uninterruptible power system, depending on the design specification.

In this illustrative embodiment, the number of the DC power supplies is 3. However, it is intended to indicate that the same can be applied to 2N+1 DC power supplies, where N is a positive integer number. For example, the power supply system of the present invention can be made up of two AC power sources and five DC power supplies, with a control module including a first relay circuit and a second relay circuit and three third relay circuits each of which is coupled with one of the DC power supplies which is not directly coupled in series with the AC power sources. Each of the three third relay circuits creates a conductive path to transfer the input voltage from the redundant AC power source to operate the DC power supply in which the third relay circuit coupled therewith. As can be known from the above discussions, the number of the third relay circuits should be identical to the number of the DC power supplies which are not directly coupled in series with the AC power sources, in order that each of the third relay circuits is employed to create a conductive path for the corresponding DC power supply. It is to be emphasized that power supply system with two power sources and 2N+1 (where N is a positive integer number) power supplies is also encompassed within the possible circuit configuration of the present invention.

Those of skill in the art will recognize that these and other modifications can be made within the spirit and scope of the invention as defined in the appended claims.

What is claimed is:

1. A power supply system comprising:

a plurality of power supplies which are connected in parallel for outputting a voltage;

a plurality of power sources, each of said power sources is directly coupled in series with a corresponding one of said power supplies to provide a voltage to operate said corresponding one of said power supplies, wherein there are said power supplies which are not directly coupled in series with said power sources; and a control module coupled between said plurality of power sources and said respective power supplies which are not directly coupled in series with said respective power sources, for creating a conductive path to transfer a voltage from one of said power sources excluded from those power sources which are interrupted in providing voltages, to operate said power supplies, wherein said control module further comprises:

a first relay circuit coupled in series with one of said power sources for receiving a voltage from one of said power sources and transmitting said voltage;

a second relay circuit coupled in series with one of those power sources which are not directly coupled in series with said first relay circuit for receiving a voltage from one of those power source and transmitting said voltage; and a plurality of third relay circuits, each of which is coupled with said first relay circuit and said second relay circuit and one of those power supplies which are not directly coupled in series with said power sources, and is configured to be switched in accordance with a zero-crossing point of the voltages from said power sources, for alternatively creating a conductive path in response to a control signal to provide either the voltage being transferred from said first relay circuit or the voltage being transferred from said second relay circuit to one of said power supplies which are not directly coupled in series with said respective power sources.

2. The power supply system as claimed in claim 1, wherein said power supplies comprises 2N+1 direct current (DC) power supplies, and said N is a positive integer number.

3. The power supply system as claimed in claim 1, wherein said plurality of power sources comprises two alternating current (AC) power sources.

4. The power supply system as claimed in claim 1, wherein said first relay circuit comprises a one-to-one relay element.

5. The power supply system as claimed in claim 1, wherein said second relay circuit comprises a one-to-one relay element.

6. The power supply system as claimed in claim 1, wherein each of said third relay circuits comprises a two-to-one relay element.

7. The power supply system as claimed in claim 1, wherein the number of said plurality of third relay circuits is identical to the number of the power supplies which are not directly coupled in series with said power sources.

8. The power supply system as claimed in claim 1, wherein said control module further comprises:

a microprocessor which persistently detects the voltages from each of said power sources and generates a control signal to drive each of said third relay circuits to create a conductive path to transfer a voltage from one of said power sources to the power supplies which are coupled with a corresponding one of said third relay circuits.

* * * * *